(12) United States Patent
Ishikawa (10) Patent No.: US 8,802,309 B2
(45) Date of Patent: Aug. 12, 2014

(54) FUEL CELL SYSTEM

(75) Inventor: Norimasa Ishikawa, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 751 days.

(21) Appl. No.: 12/280,368

(22) PCT Filed: Nov. 22, 2007

(86) PCT No.: PCT/JP2007/073122
§ 371 (c)(1),
(2), (4) Date: Aug. 22, 2008

(87) PCT Pub. No.: WO2008/069111
PCT Pub. Date: Jun. 12, 2008

(65) Prior Publication Data
US 2009/0253008 A1 Oct. 8, 2009

(30) Foreign Application Priority Data
Dec. 5, 2006 (JP) ................................ 2006-328391

(51) Int. Cl.
*H01M 8/04* (2006.01)
*H01M 8/00* (2006.01)

(52) U.S. Cl.
CPC ...... *H01M 8/04992* (2013.01); *H01M 8/04753* (2013.01); *H01M 8/04089* (2013.01); *H01M 8/04305* (2013.01); *H01M 8/04388* (2013.01); *Y02E 60/50* (2013.01); *H01M 8/04328* (2013.01)
USPC ............................ 429/429; 429/430; 429/443

(58) Field of Classification Search
USPC ................................... 429/13, 22, 25, 63–64
IPC .................................................. H01M 8/04,8/00
See application file for complete search history.

(56) References Cited

U.S. PATENT DOCUMENTS

| 6,864,003 B2 | 3/2005 | Ueda et al. |
| 7,294,421 B2 | 11/2007 | Noetzel et al. |

(Continued)

FOREIGN PATENT DOCUMENTS

| DE | 10230702 A1 | 4/2003 |
| DE | 10-2004-005 446 A1 | 8/2005 |

(Continued)

OTHER PUBLICATIONS

Machine translation of Katano (JP2005-302563).*

(Continued)

*Primary Examiner* — Jun Li
(74) *Attorney, Agent, or Firm* — Kenyon & Kenyon LLP (57) ABSTRACT

A fuel cell system of the present invention includes a fuel cell, a supply channel which supplies, to the fuel cell, a fuel gas supplied from a fuel supply source, a variable gas supply device which adjusts a gas state on an upstream side of this supply channel to supply the gas to a downstream side, a control section which performs PI control of a gas supply command amount with respect to the variable gas supply device, and an abnormality judgment section to judge whether or not the variable gas supply device is abnormal. The controller uses, as a part of a correction term of the PI control, a learning term constituted by integrating an I term only in a case where an operation state of the fuel cell satisfies predetermined learning allowable conditions. The abnormality judgment section judges based on this learning term whether or not the variable gas supply device is abnormal.

7 Claims, 4 Drawing Sheets

(56) References Cited

U.S. PATENT DOCUMENTS

| | | |
|---|---|---|
| 7,413,823 B2 | 8/2008 | Illner et al. |
| 2004/0067399 A1* | 4/2004 | Kobayashi et al. ............ 429/25 |
| 2004/0166381 A1* | 8/2004 | Muramoto ..................... 429/12 |
| 2006/0073363 A1 | 4/2006 | Taniguchi et al. |
| 2007/0069678 A1* | 3/2007 | Lindsey ....................... 318/490 |
| 2007/0218327 A1 | 9/2007 | Ishikawa et al. |

FOREIGN PATENT DOCUMENTS

| | | |
|---|---|---|
| DE | 102005045926 A1 | 4/2006 |
| JP | 63-5142 A | 1/1988 |
| JP | 5-240331 A | 9/1993 |
| JP | 2003-092125 A | 3/2003 |
| JP | 2003-223909 A | 8/2003 |
| JP | 2005-302563 A | 10/2005 |
| JP | 2005-302708 A | 10/2005 |
| JP | 2005-310550 A | 11/2005 |

OTHER PUBLICATIONS

Machine translation of Suematsu et al (JP2006-278088).*

Office Action dated Aug. 24, 2011 for U.S. Appl. No. 12/444,803 (patented related application).

* cited by examiner

FUEL CELL SYSTEM

This is a 371 national phase application of PCT/JP2007/073122 filed 22 Nov. 2007, which claims priority to Japanese Patent Application No. 2006-328391 filed 5 Dec. 2006, the contents of which are incorporated herein by reference.

TECHNICAL FIELD

The present invention relates to a fuel cell system including a variable gas supply device in a supply channel for feeding, to a fuel cell, a fuel gas supplied from a fuel supply source.

BACKGROUND ART

Heretofore, a fuel cell system including a fuel cell which receives supply of reactive gases (a fuel gas and an oxidizing gas) to generate a power has been suggested and put to practical use. In recent years, a fuel cell system has been suggested in which a fuel supply channel for supplying, to the fuel cell, the fuel gas supplied from a fuel supply source such as a hydrogen tank is provided with a variable gas supply device such as a mechanical type variable regulator or an injector, whereby a pressure of the fuel gas to be supplied from the fuel supply source can be changed in accordance with an operation state of the system (e.g., see Japanese Patent Application Laid-Open No. 2005-302563).

DISCLOSURE OF THE INVENTION

In a fuel cell system including such a variable gas supply device, a state amount (a pressure, a flow rate or the like) of the fuel gas to be supplied to the fuel cell can successively be changed. On the other hand, when a change with time or an abnormality such as failure occurs in the variable gas supply device, a gas supply state amount on a downstream side cannot precisely be controlled. Therefore, a technology capable of judging the abnormality during an operation is required.

In view of such a situation, an object of the present invention is to provide a fuel cell system capable of judging an abnormality of a variable gas supply device during an operation.

To achieve the above object, a fuel cell system according to the present invention is a fuel cell system comprising: a fuel cell; a supply channel for supplying, to the fuel cell, a fuel gas supplied from a fuel supply source; a variable gas supply device for adjusting a gas state on an upstream side of this supply channel to supply the gas to a downstream side; a control section for performing PI control of a gas supply command amount with respect to the variable gas supply device; and an abnormality judgment section for judging whether or not the variable gas supply device is abnormal, wherein the control section uses a learning term constituted by integrating an I term only in a case where an operation state of the fuel cell satisfies predetermined learning allowable conditions as a part of a correction term of the PI control, and the abnormality judgment section judges based on the learning term whether or not the variable gas supply device is abnormal.

This learning term is obtained by integrating the I term in the PI control, in other words, by integrating an integrated value (=the I term) of a deviation between a control target value (e.g., a target adjusted pressure value on a secondary side (a downstream side, a fuel cell side) of the variable gas supply device) of the PI control and an actually detected pressure value on predetermined conditions. Therefore, in a case where there is an abnormality in the variable gas supply device, the deviation between the control target value and the detected pressure value increases in excess of an allowable range of a design error or the like as compared with a case where the device is normal, and this influences the learning term. Accordingly, it can be judged based on the learning term whether or not the variable gas supply device is abnormal.

In the fuel cell system, the abnormality judgment section may perform the abnormality judgment based on the learning term only in a case where the operation state of the fuel cell satisfies the learning allowable conditions.

According to this constitution, the abnormality judgment based on the learning term is performed only in a state (a state in which the learning allowable conditions are satisfied) in which the operation state of the fuel cell is suitable for the learning of the I term, in other words, only in a case where the operation state of the fuel cell is stable, so that abnormality judgment precision improves.

Moreover, in the fuel cell system, the abnormality judgment section may judge that the variable gas supply device is abnormal at a time when a value of the learning term is outside a predetermined range.

In this constitution, to prevent that the variable gas supply device is wrongly judged to be abnormal in a case where the device is normal and to further improve the judgment precision, the abnormality judgment section may judge that the variable gas supply device is abnormal in a case where a state in which the value of the learning term is outside the predetermined range continues for a predetermined time.

In the fuel cell system, the learning term may separately be set and updated for each demanded amount of the gas to be supplied to the fuel cell that is obtained by adding up a fuel gas consumption in the fuel cell, a cross leak amount from an anode side to a cathode side in the fuel cell and a P term for use in the PI control.

The I term constituting a part of the correction term in the PI control is a temporal cumulative value of the deviation between the control target value and the actually detected value (or a value associated with this temporal cumulative value), and the learning term constituting the correction term together with this I term in the PI control is a stored accumulated value of the I term (or a value associated with this accumulated value) for each demanded amount of the gas to be supplied. Therefore, even when the control target value rapidly changes with rapid change of the demanded amount of the gas to be supplied, response delay of correction only due to the I term as the value accumulated with time can quickly be compensated by the learning term as the accumulated value of the I term, and a tracking property can be improved.

It is to be noted that the demanded amount of the gas to be supplied to the fuel cell may be calculated based on the fuel gas consumption in the fuel cell, the cross leak amount from the anode side to the cathode side in the fuel cell and a fluctuation of a target pressure value on a downstream side of the variable gas supply device.

In the fuel cell system, the variable gas supply device may be an electromagnetic driving type on-off valve (e.g., an injector) in which a valve body is directly driven with an electromagnetic driving force in a predetermined driving period and disposed away from a valve seat.

According to the present invention, in the fuel cell system including the variable gas supply device, it can be judged during the operation whether or not the variable gas supply device is abnormal.

BEST MODE FOR CARRYING OUT THE INVENTION

A fuel cell system 1 according to an embodiment of the present invention will hereinafter be described with reference to the drawings. In the present embodiment, an example in which the present invention is applied to a vehicle-mounted power generation system of a fuel cell vehicle (a mobile body) will be described, but the fuel cell system according to the present invention may be mounted on any type of mobile body (a robot, a ship, an airplane or the like) other than the fuel cell vehicle. The fuel cell system according to the present invention may be applied to a stationary power generation system for use as a power generation equipment for construction (housing, building or the like).

First, a configuration of the fuel cell system 1 according to the embodiment of the present invention will be described with reference to FIG. 1.

Figure 1:
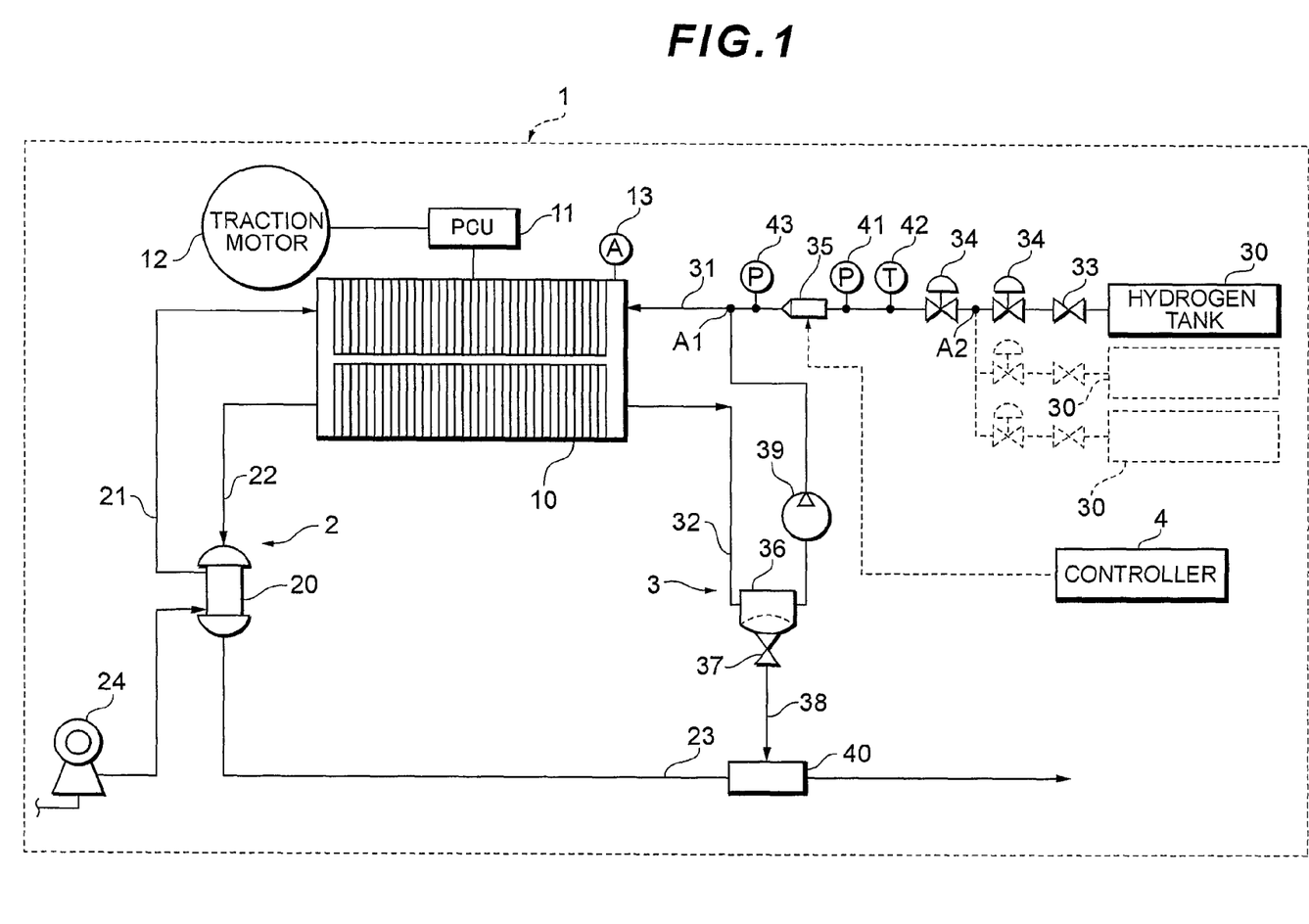
FIG. 1 is a configuration diagram of a fuel cell system according to an embodiment of the present invention.

As shown in FIG. 1, the fuel cell system 1 according to the present embodiment includes a fuel cell 10 which receives supply of reactive gases (an oxidizing gas and a fuel gas) to generate a power, and also includes an oxidizing gas piping system 2 which supplies air as the oxidizing gas to the fuel cell 10, a hydrogen gas piping system 3 which supplies a hydrogen gas as the fuel gas to the fuel cell 10, a controller (a control section, an abnormality judgment section) 4 which integrally controls the whole system and the like.

The fuel cell 10 has a stack structure in which a predetermined number of unitary cells for receiving supply of the reactive gases to generate a power owing to an electrochemical reaction are laminated. The power generated by the fuel cell 10 is supplied to a power control unit (PCU) 11. The PCU 11 includes an inverter, a DC-DC converter and the like arranged between the fuel cell 10 and a traction motor 12. Moreover, a current sensor 13 which detects a current during the power generation is provided with the fuel cell 10.

The oxidizing gas piping system 2 includes an air supply channel 21 which supplies the oxidizing gas (air) humidified by a humidifier 20 to the fuel cell 10, an air discharge channel 22 which guides, to the humidifier 20, an oxidizing off gas discharged from the fuel cell 10, and an exhaust channel 23 for guiding the oxidizing off gas from the humidifier 21. The air supply channel 21 is provided with a compressor 24 which takes the oxidizing gas from atmospheric air to feed the gas under pressure to the humidifier 20.

The hydrogen gas piping system 3 includes a hydrogen tank 30 as a fuel supply source which stores the hydrogen gas having a high pressure (e.g., 70 MPa), a hydrogen supply channel (a supply channel) 31 as a fuel supply channel for supplying the hydrogen gas of the hydrogen tank 30 to the fuel cell 10, and a circulation channel 32 for returning, to the hydrogen supply channel 31, a hydrogen off gas discharged from the fuel cell 10.

It is to be noted that instead of the hydrogen tank 30, a reformer which forms a hydrogen-rich reformed gas from a hydrocarbon-based fuel, and a high-pressure gas tank which brings the reformed gas formed by this reformer into a high-pressure state to accumulate the pressure may be employed as the fuel supply source. Alternatively, a tank having a hydrogen storing alloy may be employed as the fuel supply source.

The hydrogen supply channel 31 is provided with a shutoff valve 33 which blocks off or allows the supply of the hydrogen gas from the hydrogen tank 30, a regulator 34 which adjusts the pressure of the hydrogen gas, and an injector (a variable gas supply device) 35. On an upstream side of the injector 35, a primary pressure sensor 41 and a temperature sensor 42 which detect a pressure and a temperature of the hydrogen gas in the hydrogen supply channel 31, respectively, are provided.

Furthermore, on a downstream side of the injector 35 which is an upstream side of a joining portion of the hydrogen supply channel 31 and the circulation channel 32, there are provided a secondary pressure sensor 43 which detects a pressure of the hydrogen gas in the hydrogen supply channel 31, and a relief valve 44 which is opened in a case where a predetermined operation pressure is achieved in the hydrogen supply channel 31.

The regulator 34 is a device which adjusts an upstream-side pressure (a primary pressure) of the regulator into a beforehand set secondary pressure. In the present embodiment, a mechanical pressure reduction valve which reduces the primary pressure is employed as the regulator 34. As a constitution of the mechanical pressure reduction valve, a known constitution may be employed which has a housing including a back pressure chamber and a pressure adjustment chamber formed via a diaphragm and in which the primary pressure is reduced into a predetermined pressure owing to a back pressure of the back pressure chamber to form a secondary pressure in the pressure adjustment chamber.

The injector 35 is an electromagnetic driving type on-off valve in which a valve body is directly driven with an electromagnetic driving force in a predetermined driving period and disposed away from a valve seat, whereby a gas flow rate and a gas pressure can be adjusted. The injector 35 includes the valve seat having a jet hole which jets a gas fuel such as the hydrogen gas, and also includes a nozzle body which supplies and guides the gas fuel to the jet hole, and the valve body received and held in this nozzle body to move in an axial direction (a gas flow direction) with respect to this nozzle body to open and close the jet hole.

In the present embodiment, the valve body of the injector 35 is driven by a solenoid which is an electromagnetic driving device, and a pulse-like excitation current supplied to this solenoid can be turned on or off to switch an opening area of the jet hole in two stages, multiple stages or a stepless manner.

It is to be noted that the valve body of the injector 35 is opened or closed to adjust the gas flow rate, and the pressure of the gas to be supplied to the downstream side of the injector 35 is reduced as compared with the gas pressure on the upstream side of the injector 35, so that the injector 35 can be interpreted as a pressure adjustment valve (a pressure reduction valve, a regulator). Moreover, in the present embodiment, the injector can be interpreted as a variable pressure adjustment valve capable of changing an adjustment amount (a reduction amount) of the upstream gas pressure of the injector 35 so that the pressure meets a demanded pressure in a predetermined pressure range in accordance with a gas demand.

As described above, the injector 35 adjusts a gas state (a gas flow rate, a hydrogen molecular concentration, a gas pressure) on the upstream side of the hydrogen supply channel 31 to supply the gas to the downstream side, and the injector corresponds to the variable gas supply device in the present invention.

It is to be noted that in the present embodiment, as shown in FIG. 1, the injector 35 is arranged on the upstream side of a joining portion A1 of the hydrogen supply channel 31 and the circulation channel 32. Moreover, as shown by broken lines in FIG. 1, in a case where a plurality of hydrogen tanks 30 are employed as a fuel supply source, the injector 35 is arranged on the downstream side of a portion (a hydrogen gas joining portion A2) in which the hydrogen gases supplied from the hydrogen tanks 30 are joined.

The circulation channel 32 is connected to a discharge channel 38 via a gas-liquid separator 36 and an exhaust discharge valve 37. The gas-liquid separator 36 collects a water content from the hydrogen off gas. The exhaust discharge valve 37 operates based on a command from the controller 4 to discharge (purge), from the system, the water content collected by the gas-liquid separator 36 and the hydrogen off gas including impurities in the circulation channel 32.

Moreover, the circulation channel 32 is provided with a hydrogen pump 39 which pressurizes the hydrogen off gas in the circulation channel 32 to feed the gas toward the hydrogen supply channel 31. It is to be noted that the hydrogen off gas discharged via the exhaust discharge valve 37 and the discharge channel 38 is diluted by a diluter 40 to join the oxidizing off gas in the circulation channel 32.

The controller 4 detects an operation amount of an acceleration operating device (an accelerator or the like) provided in a vehicle, and receives control information such as a demanded acceleration value (e.g., a demanded power generation amount from a load device such as the traction motor 12) to control operations of various units in the system.

It is to be noted that the load device is a generic power consumption device including, in addition to the traction motor 12, an auxiliary device (e.g., a motor of the compressor 24, the hydrogen pump 39, or a cooling pump or the like) required for operating the fuel cell 10, an actuator for use in any type of device (a transmission, a wheel controller, a steering device, a suspension device or the like) associated with running of the vehicle, an air conditioning device (an air conditioner) of a passenger space, illumination or audio.

The controller 4 is constituted of a computer system (not shown). Such a computer system is constituted of a CPU, an ROM, an RAM, an HDD, an input/output interface, a display and the like, and the CPU reads any type of control program recorded in the ROM to execute desired calculation, whereby various processing and control such as feedback control or purge control are performed as described later.

Figure 2:
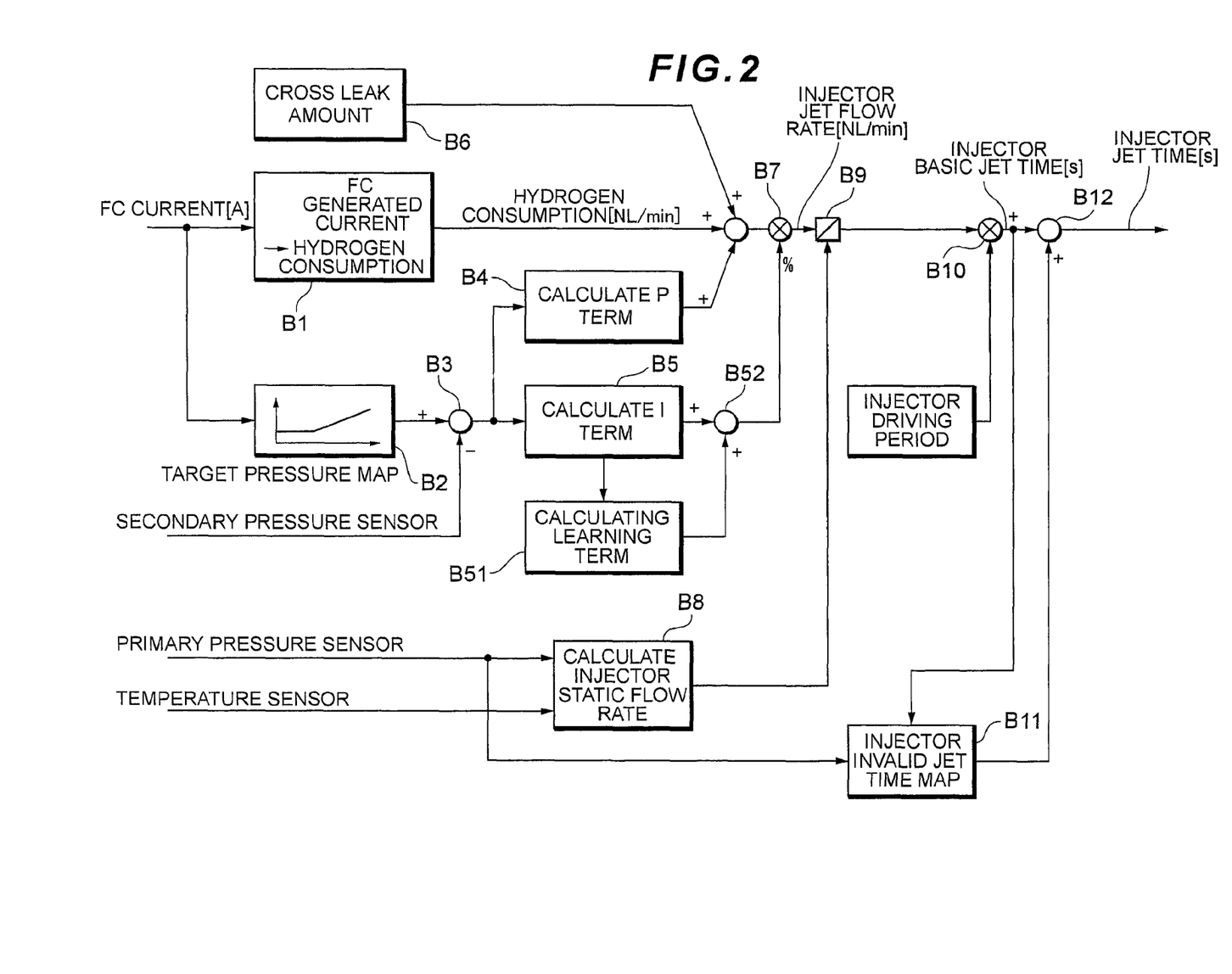
FIG. 2 is a control block diagram showing a control configuration of the fuel cell system shown in FIG. 1.

Specifically, as shown in FIG. 2, the controller 4 calculates a flow rate (hereinafter referred to as the "hydrogen consumption") of the hydrogen gas consumed by the fuel cell 10 based on a generated current value of the fuel cell 10 detected by the current sensor 13 (a fuel consumption calculating function: B1). In the present embodiment, the hydrogen consumption is calculated and updated for each calculation period of the controller 4 by use of a specific calculation formula indicating a relation between the generated current value and the hydrogen consumption.

Moreover, the controller 4 calculates a target pressure value of the hydrogen gas to be supplied to the fuel cell 10 in a downstream position of the injector 35 based on the generated current value of the fuel cell 10 (a target pressure value calculating function: B2). In the present embodiment, the target pressure value is calculated for each calculation period of the controller 4 by use of a specific map indicating a relation between the generated current value and the target pressure value.

Furthermore, the controller 4 calculates a deviation between the calculated target pressure value and a pressure value (a detected pressure value) in the downstream position of the injector 35 detected by the pressure sensor 43 (a pressure difference calculating function: B3). Then, to reduce the calculated deviation, the controller 4 calculates a proportional term (the P term) as a feedback correction flow rate (a P term calculating function: B4), and calculates an integral term (the I term) (an I term calculating function: B5).

Figure 3:
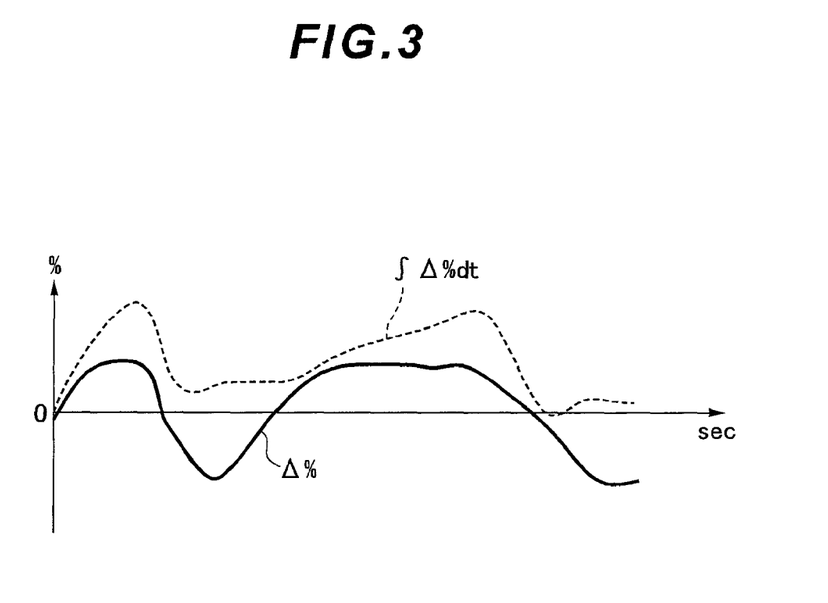
FIG. 3 is a diagram showing an I term calculating function of the control block diagram shown in FIG. 2.

In the I term calculating function B5 of the present embodiment, a feedback value (hereinafter referred to as the FB value $\Delta\%$) corresponding to a deviation $\Delta P$ calculated by the pressure difference calculating function B3 in terms of percentage is obtained using a predetermined map or the like (a solid line of FIG. 3), and further a temporal cumulative value $\int\Delta\% \, dt$ (a broken line of FIG. 3) obtained by integrating the FB value $\Delta\%$ with time is the I term. Thus, in the present embodiment, the feedback correction flow rate (a correction term) is calculated using target tracking type PI control.

Moreover, only in a case where an operation state of the fuel cell 10 satisfies predetermined conditions (learning allowable conditions), the controller 4 separately integrates the I term, which is calculated by the I term calculating function B5, for each demanded jet flow rate to the injector 35 as a demanded amount of the gas to be supplied to the fuel cell 10, to calculate a learning term updatably stored as a learning value of the I term in a memory or the like (a learning term calculating function: B51). This learning term constitutes the correction term in the PI control together with the I term.

Figure 4:
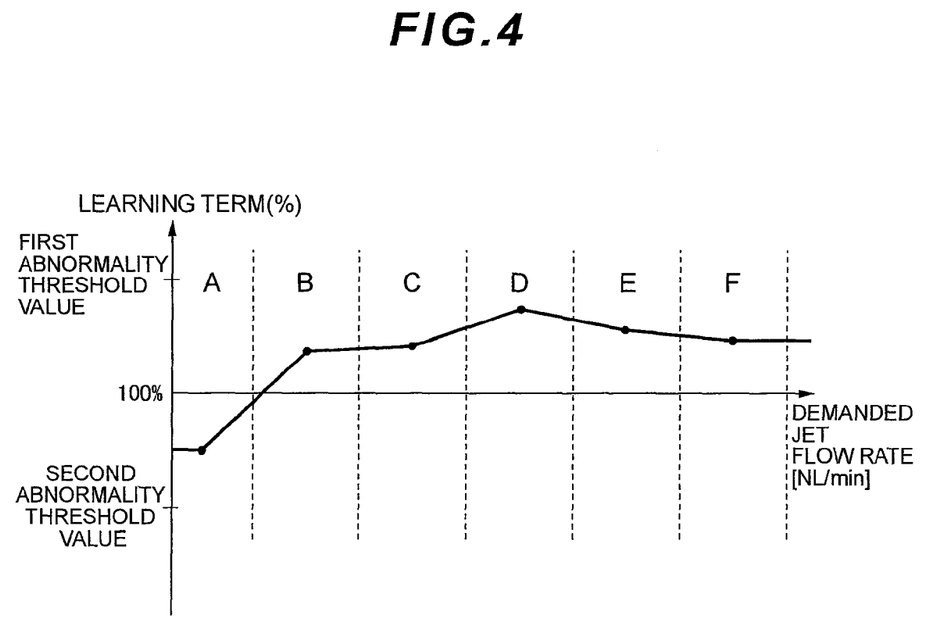
FIG. 4 is a diagram showing a learning term calculating function of the control block diagram shown in FIG. 2.

In the learning term calculating function B51 of the present embodiment, only in a case where the operation state of the fuel cell 10 satisfies the predetermined learning allowable conditions, the I term is integrated for each of learning zones A to F constituted by dividing the demanded jet flow rate of the injector 35 indicated by the abscissa of FIG. 4 along a broken line for each predetermined flow rate and is beforehand stored in the memory. Then, these integrated values (dots in FIG. 4) calculated for each of these leaning zones A to F are interpolated using interpolation or extrapolation to obtain the learning term for each demanded jet flow rate.

It is to be noted that instead of interpolating the integrated value of the I term calculated for each of the leaning zones A to F among the leaning zones A to F as shown in FIG. 4, the learning term may be set to a constant value in the leaning zones A to F.

Moreover, the predetermined learning allowable conditions are conditions set based on, for example, the generated current of the fuel cell 10. In the present embodiment, in a case where the generated current of the fuel cell 10 is larger than a predetermined generated current value in which an influence of invalid jet time is relatively small, when a change of the generated current is stable within a predetermined range, it is judged that the learning allowable conditions are satisfied.

A value of the learning term is calculated by assuming that a design value of the injector 35 is 100% and adding, to this design value, the integrate value of the I term capable of taking both positive and negative values. In a case where the value deviates from a predetermined normal range (a design error allowable range) in which upper and lower limits are defined by a first abnormality threshold value (e.g., 140%) and a second abnormality threshold value (e.g., 60%) of FIG. 4, in other words, in a case where the integrated value of the I term deviates from the predetermined normal range (e.g., a range of ±40%), it is judged that the injector 35 is abnormal.

Then, the controller 4 adds the P term to an added value of the hydrogen consumption and a cross leak amount generated in the fuel cell 10 to obtain the demanded jet flow rate to the injector 35. On the other hand, the controller 4 adds up both the I term and the learning term to integrate the terms as one integral term (an integral term integrating function: B52), and multiplies, by this added value, the demanded jet flow rate to the injector 35, to calculate a jet flow rate of the injector 35 (a jet flow rate calculating function: B7).

Here, the controller may calculate a feedforward correction flow rate corresponding to a deviation between the target pressure value previously calculated in the downstream position of the injector 35 and the presently calculated target pressure value (a feedforward correction flow rate calculating function), adds this feedforward correction flow rate to the added value (=the hydrogen consumption+the cross leak amount+the P term), and multiply this added value by the I term to calculate the jet flow rate of the injector 35.

In such a case, the feedforward correction flow rate is a fluctuation (a target pressure fluctuation correcting flow rate) of the hydrogen gas flow rate due to a change of the target pressure value. For example, the feedforward correction flow rate is updated for each calculation period of the controller 4 by use of a specific calculation formula indicating a relation between the deviation of the target pressure value and the feedforward correction flow rate.

The cross leak amount is an amount of the hydrogen gas which permeates an oxidizing gas channel (a cathode side) from a fuel gas channel (an anode side) in the fuel cell 10 via an electrolytic film, and is calculated based on the pressure value (the pressure value detected by the pressure sensor 43) of the hydrogen gas in the downstream position of the injector 35 in the present embodiment (a cross leak amount calculating function: B6). Specifically, the cross leak amount is calculated using a specific map indicating a relation between the pressure value of the hydrogen gas in the downstream position of the injector 35 and a cross leak amount.

On the other hand, the controller 4 calculates an upstream static flow rate of the injector 35 based on an upstream gas state of the injector 35 (the pressure of the hydrogen gas detected by the pressure sensor 41 and the temperature of the hydrogen gas detected by the temperature sensor 42) (a static flow rate calculating function: B8). In the present embodiment, the static flow rate is calculated and updated for each calculation period of the controller 4 by use of a specific calculation formula indicating a relation between the pressure and the temperature of the hydrogen gas and the static flow rate on the upstream side of the injector 35.

The controller 4 multiplies, by a driving period of the injector 35, a value obtained by dividing the jet flow rate of the injector 35 by the static flow rate (a duty calculating function: B9), to calculate a basic jet time of the injector 35 (a basic jet time calculating function: B10). The controller also adds an invalid jet time described later to this basic jet time to calculate a total jet time of the injector 35 (a total jet time calculating function: B12).

This driving period is a stepped (on/off) waveform-like period indicating an opening/closing state of the jet hole of the injector 35, and in the present embodiment, the controller 4 sets the driving period to a constant value.

The invalid jet time is a time required from a time when the injector 35 receives a control signal from the controller 4 to a time when jetting is actually started. In the present embodiment, the invalid jet time is calculated and updated for each calculation period of the controller 4 by use of a specific map indicating a relation between the pressure of the hydrogen gas on the upstream side of the injector 35, the basic jet time of the injector 35, and the invalid jet time (an invalid jet time calculating function: B11).

Then, the controller 4 outputs a control signal for realizing the total jet time of the injector 35 calculated through the above procedure to control a gas jet time and a gas jet timing of the injector 35, whereby a flow rate and a pressure of the hydrogen gas to be supplied to the fuel cell 10 are adjusted. As described above, the controller 4 of the present embodiment functions as not only a control section of the present invention but also an abnormality judgment section.

By the way, when an abnormality such as an operation defect or failure is generated in the injector 35, a deviation between the demanded jet flow rate to the injector 35 and an actual jet flow rate from the injector 35 increases. In a case where this deviation increases, for example, in excess of the design allowable error of the injector 35, an excessively large pressure is exerted on a system constituting element such as the fuel cell 10 arranged on the downstream side from the injector 35.

To inhibit the generation of such a defect, during an operation of the fuel cell 10 (during the supply of the reactive gases to the fuel cell 10), the fuel cell system 1 of the present embodiment monitors whether or not the injector 35 is abnormal based on the value of the learning term which the controller 4 calculated in the learning term calculating function B51. Specifically, as described above, it is judged whether the value of the learning term is larger than the first abnormality threshold value or smaller than the second abnormality threshold value. In a case where either judgment result is affirmative, it is judged that there is an abnormality in the injector 35.

Next, the abnormality judgment of the injector 35 will be described with reference to a time chart of FIG. 5.

Figure 5:
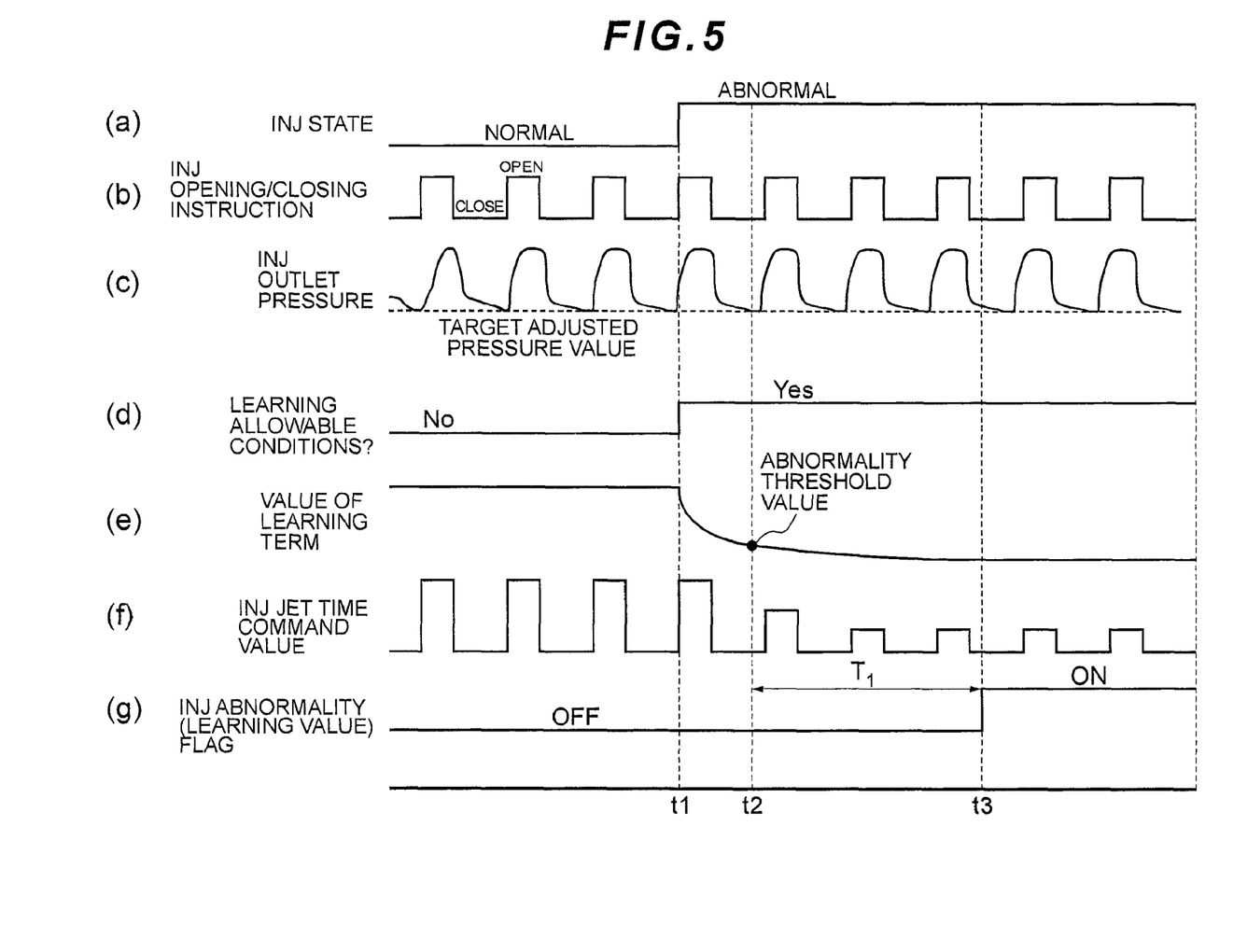
FIG. 5 is a time chart showing abnormality judgment of an injector in the fuel cell system shown in FIG. 1.

In the time chart of FIG. 5, (a) shows a state in which the injector 35 is normal or abnormal (the actual jet flow rate is larger or smaller than the demand), (b) shows an opening/closing instruction with respect to the injector 35, (c) shows an outlet pressure of the injector 35 detected by the secondary pressure sensor 43, (d) shows whether or not the learning allowable conditions of the I term are satisfied, (e) shows a change of the value of the learning term with time, (f) shows a command value of the jet time with respect to the injector 35, and (g) shows an injector abnormality flag indicating that an abnormality is generated in the value of the learning term, that is, an abnormality is generated in the injector 35.

As shown in FIG. 5(d), the controller 4 judges whether or not the operation state of the fuel cell 10 satisfies the learning allowable conditions of the I term in a predetermined control period. When a result of this learning allowable judgment is negative (FIG. 4: No) (before time t1), the learning of the I term, that is, the update of the value of the learning term is prohibited.

In the present embodiment, before the time t1, the injector 35 operates in a normal range (a design error allowable range). In such a case, as shown in FIG. 5(c), the outlet pressure of the injector 35 repeats vertical fluctuation based on the opening/closing instruction with respect to the injector 35 shown in FIG. 5(b). At this time, the jet time command value of the injector 35 shown in FIG. 5(f) is controlled so that the jet time of the injector 35 during valve opening is constant every time.

On the other hand, when the operation state of the fuel cell 10 satisfies the learning allowable conditions of the I term (after the time t1), that is, when the result of the learning allowable judgment is affirmative (FIG. 4: Yes), the value of the learning term shown in FIG. 5(e) is updated (learned) for each demanded jet amount of the injector 35 (FIG. 4).

Then, in a case where the value of the learning term is above the first abnormality threshold value or below the second abnormality threshold value during this update (during the learning) (time t2), the controller 4 judges that the jet flow rate of the injector 35 could have an abnormality, and lowers the jet time command value of the injector 35 shown in FIG. 5(f) as compared with the previous command value. It is to be noted that FIG. 5 shows a case where the value of the learning term is below the second abnormality threshold value.

Subsequently, the controller 4 continuously monitors the value of the learning term shown in FIG. 5(e). In a case where a predetermined standby time T1 elapses without returning the value of the learning term between the first abnormality threshold value and the second abnormality threshold value (the normal range), the controller finally judges that the jet flow rate of the injector 35 has an abnormality, and sets the injector abnormality flag from "OFF" to "ON" as shown in FIG. 5(g).

According to the fuel cell system 1 of the above-mentioned embodiment, even in a case where the abnormality is generated in the injector 35 and the jet flow rate increases or decreases in excess of the allowable range of the design error or the like as compared with a case where the injector 35 is normal, the controller 4 monitors the learning result of the I term in the PI control updated (learned) only on the predetermined learning allowable conditions in the predetermined control period, that is, monitors based on the appropriately updated value of the learning term whether or not the abnormality is generated. Therefore, the abnormality of the injector 35 can be judged without delay during the operation.

Moreover, when the injector abnormality flag is "ON", the controller 4 can perform injector abnormality judgment post-processing, for example, the controller performs the control of opening/closing driving of the injector 35 once or a plurality of times during the operation of the fuel cell 10 so as to eliminate the abnormality of the injector 35, or stops the operation of the fuel cell 10. In addition, this flag can be read from the controller 4 during maintenance or the like to confirm a failure history indicating that the abnormality has been generated in the injector 35, so that handling such as replacement or repair of the injector 35 can quickly be performed.

The invention claimed is:

1. A fuel cell system comprising:
a fuel cell;
a supply channel for supplying, to the fuel cell, a fuel gas supplied from a fuel supply source;
a single variable gas supply device for adjusting a gas state on an upstream side of the supply channel to supply the gas to a downstream side;
a computer system including a control section programmed to perform proportional and integral (PI) control of a gas supply command amount with respect to the variable gas supply device;
an abnormality judgment section programmed to judge whether or not the variable gas supply device is abnormal;
a current sensor for detecting a current during a power generation by the fuel cell; and
a pressure sensor for detecting a pressure of the fuel gas in the supply channel, the pressure sensor provided on the downstream side of the variable gas supply device,
wherein the control section is programmed to use, as a part of a correction term of the PI control, a learning term constituted by integrating an integral (I) term only in a case where an operation state of the fuel cell satisfies predetermined learning allowable conditions, the predetermined learning allowable conditions are satisfied when a generated current of the fuel cell detected by the current sensor is larger than a predetermined generated current value and a change of the generated current is stable within a predetermined range,
wherein the abnormality judgment section is programmed to judge, based on the learning term, whether or not the variable gas supply device is abnormal,
wherein the I term of the PI control is calculated by integrating a feedback value corresponding to a deviation between a pressure value detected by the pressure sensor downstream of the supply device and a target pressure value, and
wherein the I term of the PI control is integrated for each of a plurality of learning zones, the plurality of learning zones being constituted by dividing a demanded jet flow rate of the variable gas supply device for each of a plurality of predetermined flow rates.

2. The fuel cell system according to claim 1, wherein the abnormality judgment section performs the abnormality judgment based on the learning term only in a case where the operation state of the fuel cell satisfies the learning allowable conditions.

3. The fuel cell system according to claim 2, wherein the abnormality judgment section judges that the variable gas supply device is abnormal at a time when a value of the learning term is outside a predetermined range.

4. The fuel cell system according to claim 3, wherein the abnormality judgment section judges that the variable gas supply device is abnormal in a case where a state in which the value of the learning term is outside the predetermined range continues for a predetermined time.

5. The fuel cell system according to claim 1, wherein the learning term is separately set and updated for each demanded amount of the gas to be supplied to the fuel cell that is obtained by adding up a fuel gas consumption in the fuel cell, a cross leak amount from an anode side to a cathode side in the fuel cell, and a P term for use in the PI control.

6. The fuel cell system according to claim 1, wherein the learning term is separately set and updated for each demanded amount of the gas to be supplied to the fuel cell that is obtained by adding up a fuel gas consumption in the fuel cell, a cross leak amount from an anode side to a cathode side in the fuel cell, a target pressure fluctuation correcting flow rate calculated based on a fluctuation of a target pressure value on a downstream side of the variable gas supply device, and a P term for use in the PI control.

7. The fuel cell system according to claim 1, wherein the variable gas supply device is an electromagnetic driving type on-off valve in which a valve body is directly driven with an electromagnetic driving force in a predetermined driving period and disposed away from a valve seat.

* * * * *

UNITED STATES PATENT AND TRADEMARK OFFICE
CERTIFICATE OF CORRECTION

| | | |
|---|---|---|
| PATENT NO. | : 8,802,309 B2 | Page 1 of 1 |
| APPLICATION NO. | : 12/280368 | |
| DATED | : August 12, 2014 | |
| INVENTOR(S) | : N. Ishikawa | |

It is certified that error appears in the above-identified patent and that said Letters Patent is hereby corrected as shown below:

On the Title of the patent, in the field indicated by "(*) Notice", after "U.S.C. 154(b) by 751 days.",
insert a new paragraph -- This patent is subject to a terminal disclaimer. --

Signed and Sealed this
Tenth Day of February, 2015

Michelle K. Lee
*Deputy Director of the United States Patent and Trademark Office*